W. E. BLAIR.
NUTCRACKER.
APPLICATION FILED MAY 14, 1915.
1,194,592.
Patented Aug. 15, 1916.
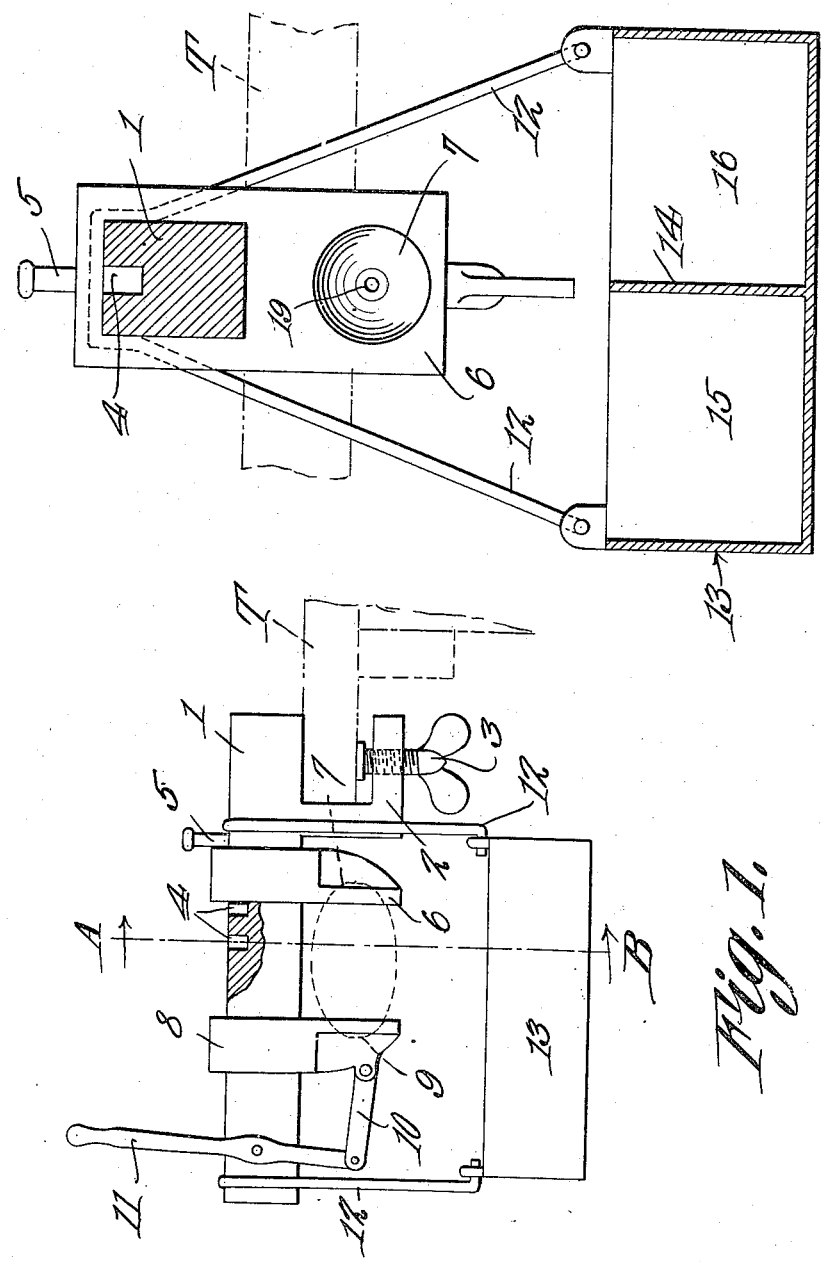
Witnesses
W. E. Blair
Inventor,
by
Attorneys.

UNITED STATES PATENT OFFICE.

WILLIAM E. BLAIR, OF BALLINGER, TEXAS.

NUTCRACKER.

1,194,592.  Specification of Letters Patent.  Patented Aug. 15, 1916.

Application filed May 14, 1915.  Serial No. 28,108.

*To all whom it may concern:*

Be it known that I, WILLIAM E. BLAIR, a citizen of the United States, residing at Ballinger, in the county of Runnels and State of Texas, have invented a new and useful Nutcracker, of which the following is a specification.

This invention relates to nut crackers particularly designed for use in cracking pecan nuts.

One of the objects of the invention is to provide a simple and durable device of this character which may be readily attached to a table or other support and which is quickly adjustable for use in connection with nuts of different sizes.

A further object is to provide a device of this character having a tray supported therefrom for the reception of the cracked nuts and for holding nuts to be cracked.

Another object is to provide simple means for actuating the nut cracker.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of the device, a portion being broken away. Fig. 2 is a section on line A—B Fig. 1.

Referring to the figures by characters of reference 1 designates a bar provided, near one end, with a depending angular arm 2 constituting a jaw adapted to coöperate with one end portion of the bar 1 to grip a table or other support indicated generally at T. The arm 2 is preferably provided with a clamping screw 3 whereby the bar 1 can be securely fastened to a support. Said bar 1 is provided in its upper face with a longitudinal series of recesses 4 any one of which is adapted to receive a stop pin 5. Slidably mounted on the bar 1 is a jaw 6 depending from the bar and having a recess 7 for the reception of one end of a nut. This jaw, during the operation of the device, is held stationary and bears against the pin 5. Another jaw 8 is slidably mounted on the bar 1 and is likewise provided with a recess 9 similar to recess 7, for the reception of one end of a nut. This jaw 8 has a link 10 pivotally connected thereto at a point substantially in horizontal alinement with the recess 9, this link being attached to the lower end of an actuating lever 11 which is fulcrumed on the bar 1.

Downwardly diverging rods or wires 12 detachably engage the bar 1 and are connected to the corner portions of a tray 13, this tray being divided by a partition 14 into separate compartments 15 and 16. The jaws 6 and 8 are interposed between the hangers 12 so that the tray is thus held in position to receive the nuts as they are cracked.

In using the device, the bar 1 is fastened to a support, after which the tray 13 is suspended therefrom by means of the wires or rods 12. The jaw 6 is then adjusted toward or from the lever 11, the amount of adjustment being dependent upon the sizes of the nuts to be cracked. After the adjustment has been effected the pin 5 is inserted into the bar 1 directly back of the jaw so as to constitute an abutment therefor. The nut to be cracked is then removed from one of the compartments of tray 13 and placed with one end in recess 7 while the other end is held until jaw 8 is thrust thereagainst by means of lever 11, the end of the nut entering the recess 9. The nut, when cracked, can be placed in the other compartment in the tray.

It will be seen that the entire structure is very simple, durable and efficient and is especially convenient because it utilizes the tray which will catch any small pieces of nut or shell which may fall from between the jaws.

What is claimed is:—

1. A nut cracker including a bar, support engaging means at one end of the bar, a lever fulcrumed upon the other end of the bar, a jaw adjustable longitudinally of the bar, said bar having a series of recesses in one face, a stop device detachably mounted in one of the recesses and engaged by said jaw, a second jaw slidably mounted on the bar, a link connection between said jaw and the lever, said link being connected to the jaw adjacent the lower end thereof, both jaws having recesses in the lower end portions.

2. A nut cracker including a bar, support engaging means at one end of the bar, a stationary jaw depending from the bar, means for adjusting the same, a jaw depending from and slidably mounted on the bar, means for actuating the slidable jaw, both jaws having recesses in the lower end portions, hangers straddling the bar and having downwardly diverging portions, and a tray detachably connected to the lower terminals of said downwardly diverging portions, the jaws being arranged between the hangers and above the tray.

In testimony that I claim the foregoing as my own, I have hereto affixed my signature in the presence of two witnesses.

WILLIAM E. BLAIR.

Witnesses:
LEE MADDOX,
E. SHEPPERD.

Copies of this patent may be obtained for five cents each, by addressing the "Commissioner of Patents, Washington, D. C."